US007822317B2

(12) United States Patent
Hagiwara

(10) Patent No.: US 7,822,317 B2
(45) Date of Patent: Oct. 26, 2010

(54) BROADCAST PROGRAM RECORDING APPARATUS AND PROGRAM FOR EXECUTING A BROADCAST PROGRAM REPRODUCING PROCESS

(75) Inventor: Kazuaki Hagiwara, Koganei (JP)

(73) Assignee: Casio Computer Co., Ltd, Tokyo (JP)

( * ) Notice: Subject to any disclaimer, the term of this patent is extended or adjusted under 35 U.S.C. 154(b) by 1084 days.

(21) Appl. No.: 11/517,612

(22) Filed: Sep. 7, 2006

(65) Prior Publication Data
US 2007/0061852 A1 Mar. 15, 2007

(30) Foreign Application Priority Data
Sep. 12, 2005 (JP) ............................. 2005-263173
Jun. 8, 2006 (JP) ............................. 2006-159182

(51) Int. Cl.
*H04N 5/91* (2006.01)
(52) U.S. Cl. ............................. 386/68; 386/46; 386/69
(58) Field of Classification Search ................. 386/46, 386/68–70, 124–126
See application file for complete search history.

(56) References Cited
U.S. PATENT DOCUMENTS
7,272,295 B1 * 9/2007 Christopher ................. 386/46

2003/0031458 A1 * 2/2003 Takahashi ................... 386/46
2006/0093320 A1 * 5/2006 Hallberg et al. .............. 386/68

FOREIGN PATENT DOCUMENTS
JP 10-208326 * 7/1998
JP 2004-140675 A 5/2004

* cited by examiner

*Primary Examiner*—Thai Tran
*Assistant Examiner*—Mishawn Dunn
(74) *Attorney, Agent, or Firm*—Holtz, Holtz, Goodman & Chick, PC

(57) ABSTRACT

A recorded broadcast program including CM portions is reproduced with CM portions skipped. When an instruction to execute a fast forward operation is entered at the beginning of CM portion and an instruction to execute a reproducing operation is entered at the termination of CM portion while the recorded broadcast program data including CM data is read out and reproduced from a recording unit 111, CPU 110 stores in the recording unit 111 a time length obtained by subtracting a time at which the instruction to execute a fast forward operation is entered from a time at which the instruction to execute a reproducing operation is entered, an image which is being reproduced at the time at which the instruction to execute a fast forward operation is entered, and a title of the image. CPU 110 further compares an image which is being reproduced with the image stored in the recording unit, and skips a reading position on the recording unit 111 based on the time length stored in the recording unit 111, when the compared images coincide with each other.

8 Claims, 7 Drawing Sheets

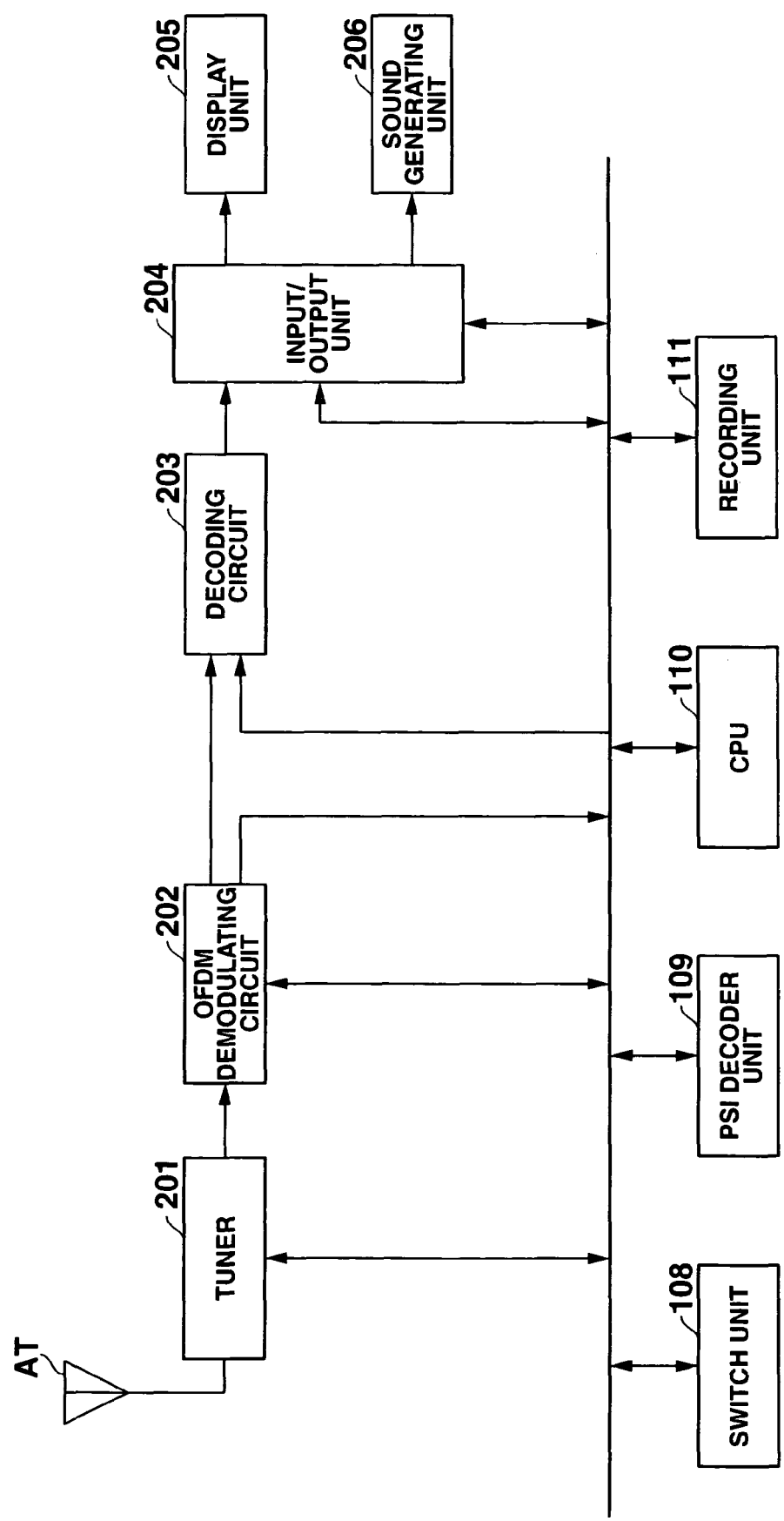

BROADCAST PROGRAM RECORDING APPARATUS AND PROGRAM FOR EXECUTING A BROADCAST PROGRAM REPRODUCING PROCESS

CROSS-REFERENCE TO RELATED APPLICATIONS

This application is based upon and claims the benefit of priority from the prior Japanese Patent Application No. 2005-263173, filed Sep. 12, 2005 and No. 2006-159182, filed Jun. 8, 2006, the entire contents of which are incorporated herein by reference.

BACKGROUND OF THE INVENTION

1. Field of the Invention

The present invention relates to a broadcast program recording apparatus and a program for executing a broadcast program reproducing process.

2. Description of the Relates Art

In addition to BS broadcasts by making use of a broadcast satellite and CS broadcasts by making use of a communication satellite, which are now available, digital terrestrial broadcasts are starting to provide their services.

In Japan, for example, in addition to BS broadcasts by making use of a broadcast satellite and CS broadcasts by making use of a communication satellite, which are now providing services, digital terrestrial broadcasts started providing their services in local areas from December, 2003 and all the conventional analog terrestrial broadcasts are scheduled to be replaced with the digital terrestrial broadcasts in 2011. In the digital terrestrial broadcast, plural sorts of information such as video information, audio information and character information are multiplexed into multiplex MPEG-2 transport stream by OFDM (Orthogonal Frequency Division Multiplexing) system, wherein information of a frequency band of about 6 MHz is divided into 13 segments to be transferred. That is, one segment consists of a frequency band of about 429 KHz, and 13 segments are combined into one channel of about 6 MHz. 10 segments to 13 segments out of the 13 segments are to be used to broadcast a high-definition high-quality television (HDTV) for stationary TV receivers with large display screens. In addition, simple motion-image broadcasts using a single-segment is planed to start providing the services for mobile terminals with small display screens, such as cellular phones, PDA (Personal Digital Assistants), portable TV receivers and car navigators.

Therefore, it is possible to record broadcast programs not only with stationary TV receivers but with mobile terminals such as cellular phones, and environments in which recorded broadcast program can be reproduced not only at home but at any places outside home are developing. Images of commercial broadcasts (CM) will become a problem in reproducing a recorded broadcast program. In bilingual broadcasts such as movie programs, it is possible to skip CM portions automatically by separating CM portions from the program portion depending on audio signals, but it is not possible in recorded normal program data (not bilingual broadcast) to separate CM portions from the program portion depending on audio signals. Therefore, a user is required to operate an apparatus to execute a fast forward operation to skip CM portion during reproducing the normal program data, but it is extremely difficult for the user to execute the fast forward operation every CM portion to skip them. In particular, when the user is viewing a TV program on the mobile terminal, which the user carries outside home, such as a cellular phone, PDA, portable TV receiver and car navigator, the user often cannot operate his or her apparatus to execute the fast forward operation without any restriction.

Although such apparatus does not skip images of CM, JP 2004-140675 A (patent document) discloses the recording apparatus, which reproduces a recorded TV program data, skipping some portions of the program data, depending on audio signals included in TV broadcast program. Such apparatus does not require the user to operate any troublesome manipulation to search for and skip to important scenes and/or exciting scenes often with BGM played in the program. Upon detection of the beginning of BGM, the apparatus sends BGM detection signal, and upon detection of BGM switched, the apparatus sends switched-BGM detection signal. In the apparatus, time data of the BGM detection signal or switched-BGM detection signal is recorded as separation data, which are used to separate the recorded program data, and recorded at the leading positions of the separated program data (chapters) on a recording medium. Thumbnail images of leading images of the separated chapters are recorded on the recording medium in association with the time data. When the program data stored on the recording medium is reproduced, the thumbnail image of each chapter is displayed. When a thumbnail image is chosen, the chapter (separated program data) corresponding to the chosen thumbnail image is reproduced from its leading portion.

In the apparatus disclosed in the above patent document, when CM is detected in the program data by CM detecting unit, CM detection signal is sent out, and even though BGM is played or BGM is switched during CM period, the program data is not separated into chapters. However, in the patent document is given no specific description on how the CM detecting means detects CM portion in the program data. In conventional techniques including the apparatus disclosed in the above patent document, when general program data, in which CM portions cannot be separated from the program portion based on audio data, is recorded, no specific arrangement is provided for detecting such CM portions involved in the program data during a reproducing operation.

The present invention has been made to solve the above problem, and has an object to provide an apparatus and a computer program, which can reproduce a recorded broadcast program data with CM portions skipped.

SUMMARY OF THE INVENTION

According to one aspect of the present invention, there is provided a broadcast program recording apparatus, which stores time information based on a time at which an instruction to execute a fast forward operation is entered and a time at which an instruction to execute a reproducing operation is entered, and an image which is being reproduced at the time when the instruction to execute a fast forward operation is entered, when the instruction to execute a fast forward operation is entered while the apparatus is reproducing the broadcast program data, and the instruction to execute a reproducing operation is entered during the fast forward operation. Thereafter, the apparatus compares an image of a broadcast program data which is being reproduced and the recorded image to judge whether both images coincide with each other, and executes a fast forward operation to skip a reading position of the recorded broadcast program data based on the stored time information, when it is determined that both images coincide with each other.

According to another aspect of the present invention there is provided a storage medium on which a computer program for executing a broadcast program reproducing process is recorded, the computer program, when loaded on a broadcast program reproducing apparatus provided with a computer, causing the computer to read out recorded broadcast program data and reproduce the read out broadcast program data. When an instruction to execute a fast forward operation is entered while the broadcast program data is being reproduced and an instruction to execute a reproducing operation is entered during the fast forward operation, the computer program causes the computer to store time information based on a time at which the instruction to execute a fast forward operation is entered and a time at which the instruction to execute a reproducing operation is entered, and an image which is being reproduced at the time when the instruction to execute a fast forward operation is entered, and to compare an image of the broadcast program data which is being reproduced and the stored image to judge whether both images coincide with each other, and further causing the computer to execute a fast forward operation to skip a reading position of the stored broadcast program data based on the stored time information, when it is determined that both images coincide with each other.

BRIEF DESCRIPTION OF THE DRAWINGS

FIG. 7 is a block diagram illustrating a circuit configuration of a broadcast program recording apparatus according to the second embodiment of the present invention.

DETAILED DESCRIPTION OF THE PREFERRED EMBODIMENTS

Now, the first and second embodiments of a broadcast program recording apparatus and a program for a broadcast program reproducing process in the broadcast program recording apparatus, according to the present invention will be described in detail with reference to the accompanying drawings.

Figure 1:
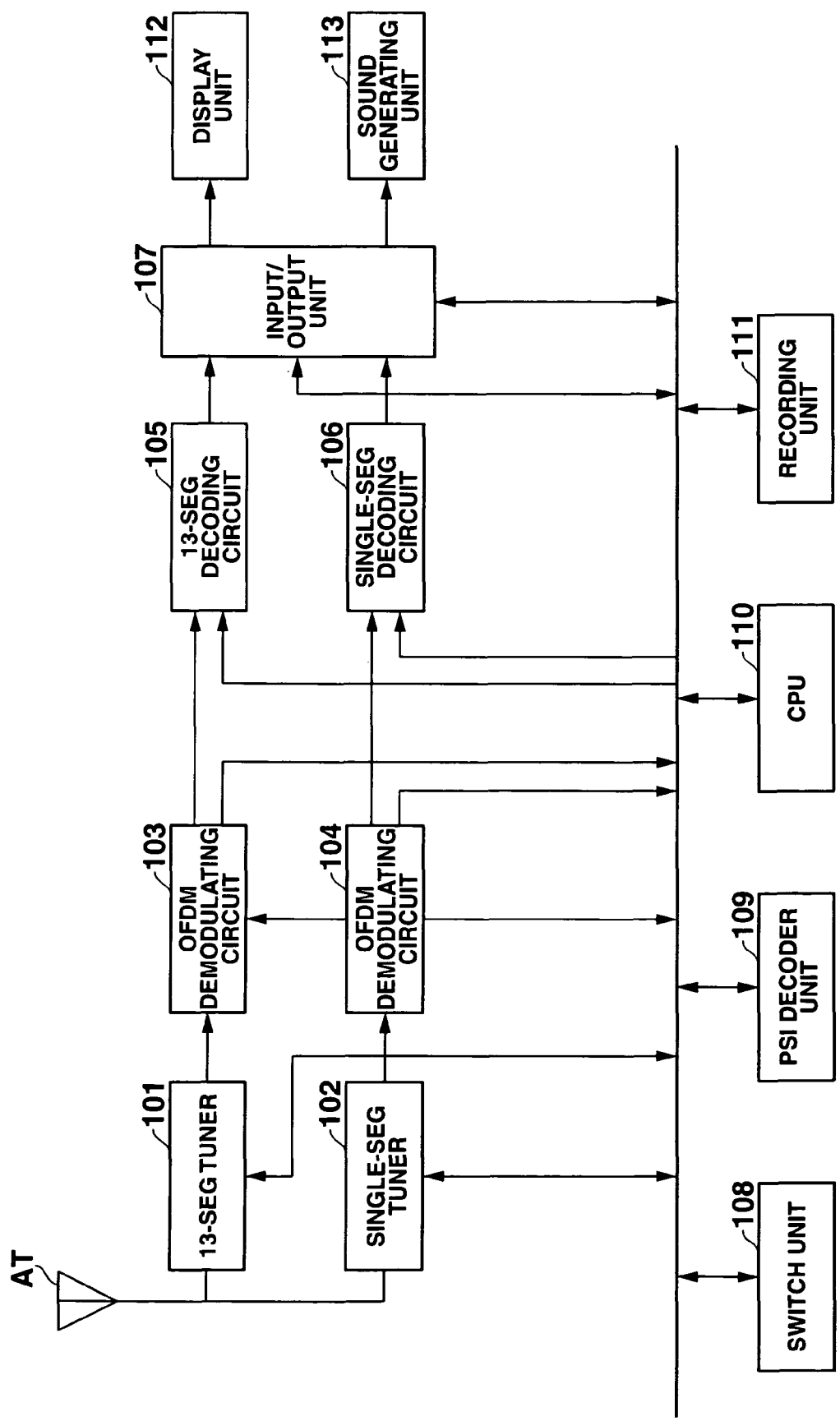
FIG. 1 is a block diagram illustrating a circuit configuration of a broadcast program recording apparatus according to the first embodiment of the present invention.

First, the first embodiment of the broadcast-program recording apparatus will be described. FIG. 1 is a block diagram illustrating a circuit configuration of the broadcast program recording apparatus. The broadcast program recording apparatus comprises a broadcast program reproducing system and a control system, both systems being connected to each other through a system bus. The broadcast program reproducing system receives digitalized broadcasts of 13-segments and a digitalized broadcast of a single-segment of the digitalized terrestrial broad cast through an antenna AT. A 13-segment tuner 101 selects a reception signal based on a preset channel out of broadcast waves of 13 segments received through the antenna AT. A single-segment tuner 102 selects a reception signal based on the same preset channel as the 13 segments out of broadcast waves of one segment received through the antenna AT. OFDM (Orthogonal Frequency Division Multiplexing) demodulating circuit 103 demodulates the reception signal of 13 segments selected by the tuner 101. OFDM demodulating circuit 104 demodulates the reception signal of the single-segment selected by the tuner 102. A decoding circuit 105 for 13 segments decodes the reception signal demodulated by OFDM demodulating circuit 103 to 13-segment program data including video data and audio data. A decoding circuit 106 for a single-segment decodes the reception signal demodulated by OFDM demodulating circuit 104 to single-segment program data including video data and audio data. An input/output unit 107 displays on a display unit 112 video data of the program data decoded by the decoding circuits 105 and 106, and generates sounds of the program data from a sound generating unit 113.

In the control system, CPU 110 comprises ROM (not shown) for storing a control program and initial data and RAM (not shown) used as a work area. CPU 110 is connected with the tuners 101, 102, OFDM demodulating circuits 103, 104, decoding circuits 105, 106, and input/output unit 107 through the system bus. Further, CPU 110 is connected with a switch unit 108, PSI (Program Specific Information: program specifying information) decoder unit 109, and recording unit 111. CPU 110 executes the control program stored on ROM in response to operation of the switch unit 108, whereby data to be processed is temporarily stored on RAM and the broadcast program recording apparatus is controlled. PSI decoder unit 109 derives a title of the broadcast program and other data from the demodulated reception signal. The recording unit 111 comprises, for example, a hard disk drive (HDD), and records in accordance with a recording instruction generated by operation of the switch unit 108 the program data of 13-segments demodulated by the OFDM demodulating circuit 103, and program data of the single-segment demodulated by the OFDM demodulating circuit 104, that is, the recording unit 111 records encoded program data on a recording medium such as a hard disk. Meanwhile, in response to a reproducing instruction generated by operation of the switch unit 108, CPU 110 reads out the video data and audio data of 13-segments and single-segment recorded in the recording unit 111. CPU 110 makes the decoding circuits 105 and 106 decode the video data and audio data respectively, whereby the decoded data are output from the input/output unit 107 to the display unit 112 and sound generating unit 113.

FIG. 2 to FIG. 6 are flow charts showing processes performed by CPU 110 in the broadcast program recording apparatus shown in FIG. 1.

Figure 2:
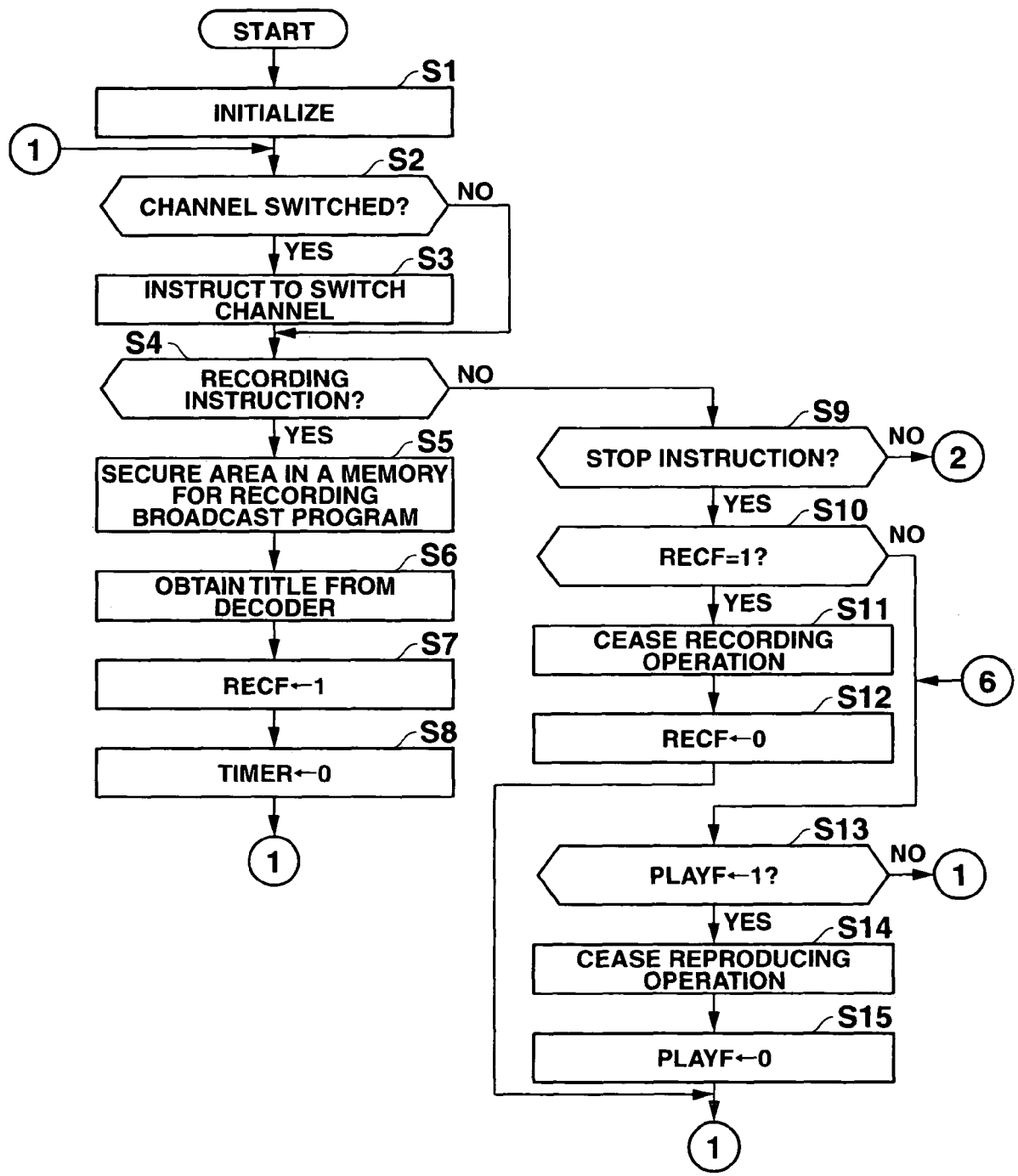
FIG. 2 is a flow chart of a broadcast program reproducing process executed by CPU of FIG. 1.

In the flowchart of FIG. 2, CPU 110 executes a predetermined initializing process at step S1, and judges at step S2 whether or not a channel switching instruction has been given by operation of the switch unit 108. When the channel switching instruction has been given, CPU 110 instructs the tuners 101 and 102 to switch a channel at step S3. Further, CPU 110 judges at step S4 whether or not a recording instruction has been given. When the recording instruction has been given, CPU 110 secures at step S5 an empty area in a memory (recording medium in the recording unit 111) for recording a broadcast program. Then, CPU 110 obtains a title of program data to be recorded from PSI decoder unit 109 at step S6, and sets a record flag RECF to "1" at step S7 and resets a timer of RAM to "0" at step S8. Thereafter, CPU 110 returns to step 2, where CPU 110 judges whether or not the switch unit 108 has been operated.

CPU 110 judges at step S9 whether or not a stop instruction has been given by operation of the switch unit 108. When the stop instruction has been given, then CPU 110 judges at step S10 whether RECF has been set to "1" or not (in a recording operation). When RECF has been set to "1", CPU 110 ceases the recording operation at step S11 and resets RECF to "0" at step S12. When RECF has been set to "0", CPU 110 judges at step S13 whether a reproduction flag PLAYF has been set to "1" (in a reproducing operation) or not. When PLAYF has been set to "1", CPU 110 ceases the reproducing operation at step S14 and resets PLAYF to "0" at step S15. After RECF or PLAYF has been reset to "0", or when both RECF and PLAYF have been set to "0", CPU 110 returns to step S2, where CPU 110 judges whether or not the switch unit 108 has been operated.

Figure 3:
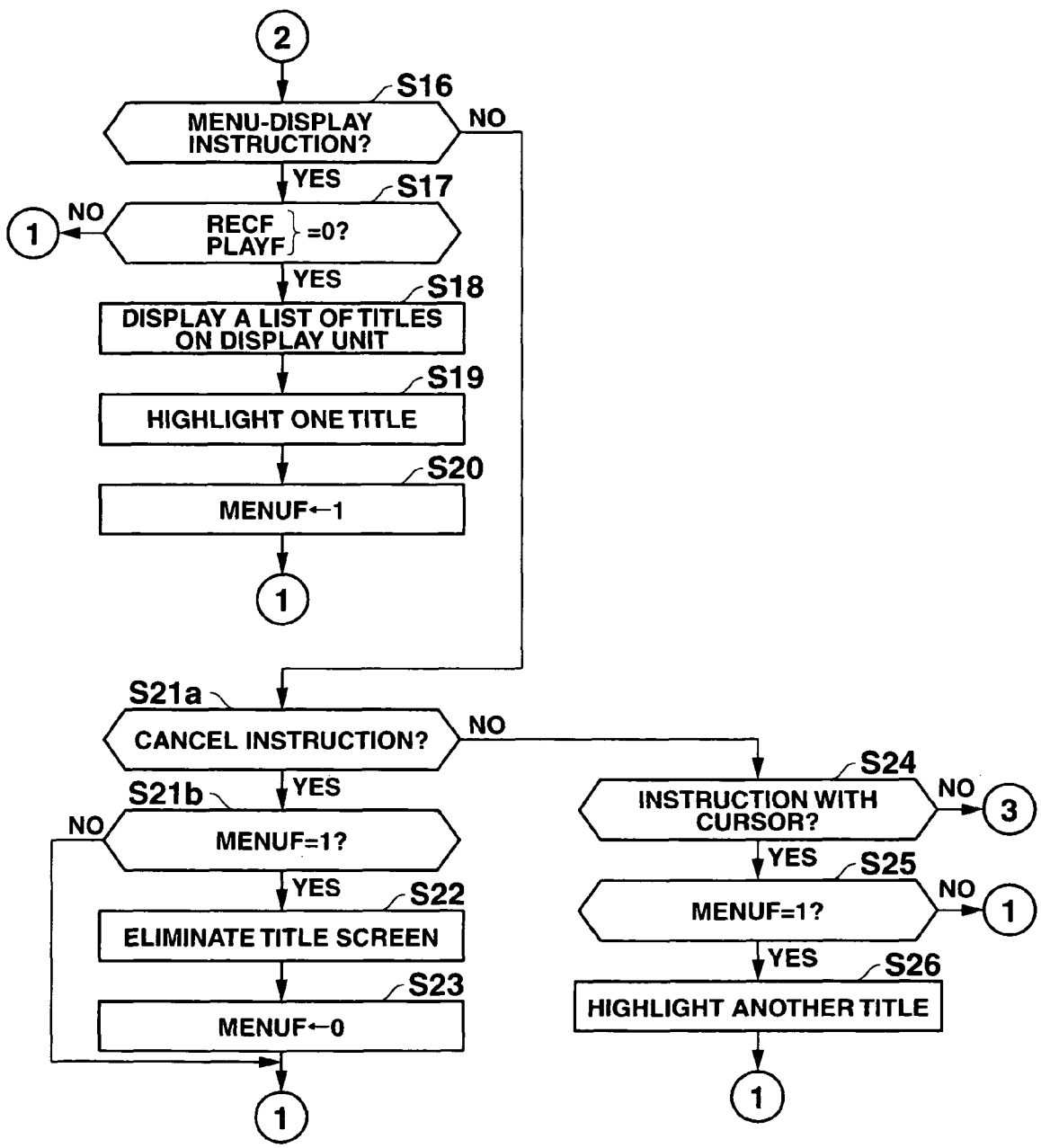
FIG. 3 is a flow chart of the broadcast program reproducing process following to FIG. 2.

In the flow chart of FIG. 3, CPU 110 judges at step S16 whether or not a menu-display instruction has been given by operation of the switch unit 108. When the menu-display instruction has been given, CPU 110 judges at step S17 whether or not both RECF and PLAYF have been set to "0". When both RECF and PLAYF have been set to "0", CPU 110 makes the input/output unit 107 display a list of titles of broadcast programs to be recorded, which are recorded in the recording unit 111. CPU 110 highlights one title of a broadcast program (for example, the first title in the title list) at step 19, and sets a menu flag MENUF to "1" (title display) at step S20. After MENUF has been set to "1", or when RECF or PLAYF has been set to "1" at step S17, CPU 110 returns to step S2 of FIG. 2, where CPU 110 judges whether or not the switch unit 108 has been operated.

CPU 110 judges at step S21a whether or not a cancel instruction has been given by operation of the switch unit 108. When the cancel instruction has been given, CPU 110 judges at step S21b whether MENUF has been set to "1" or not. When MENUF has been set to "1", CPU 110 eliminates a title screen at step S22, and resets MENUF to "0" at step S23. After resetting MENUF to "0", CPU 110 returns to step S2, where CPU 110 judges whether or not the switch unit 108 has been operated.

CPU 110 judges at step S24 whether or not an instruction has been given by means of a cursor of the switch unit 108. When an instruction has been given by means of the cursor of the switch unit 108, CPU 110 judges at step S25 whether MENUF has been set to "1" or not. When MENUF has been set to "1", CPU 110 highlights another title at step S26. After highlighting another title, or when MENUF has been set to "0", CPU 110 returns to step S2 in FIG. 2, where CPU 110 judges whether or not the switch unit 108 has been operated.

Figure 4:
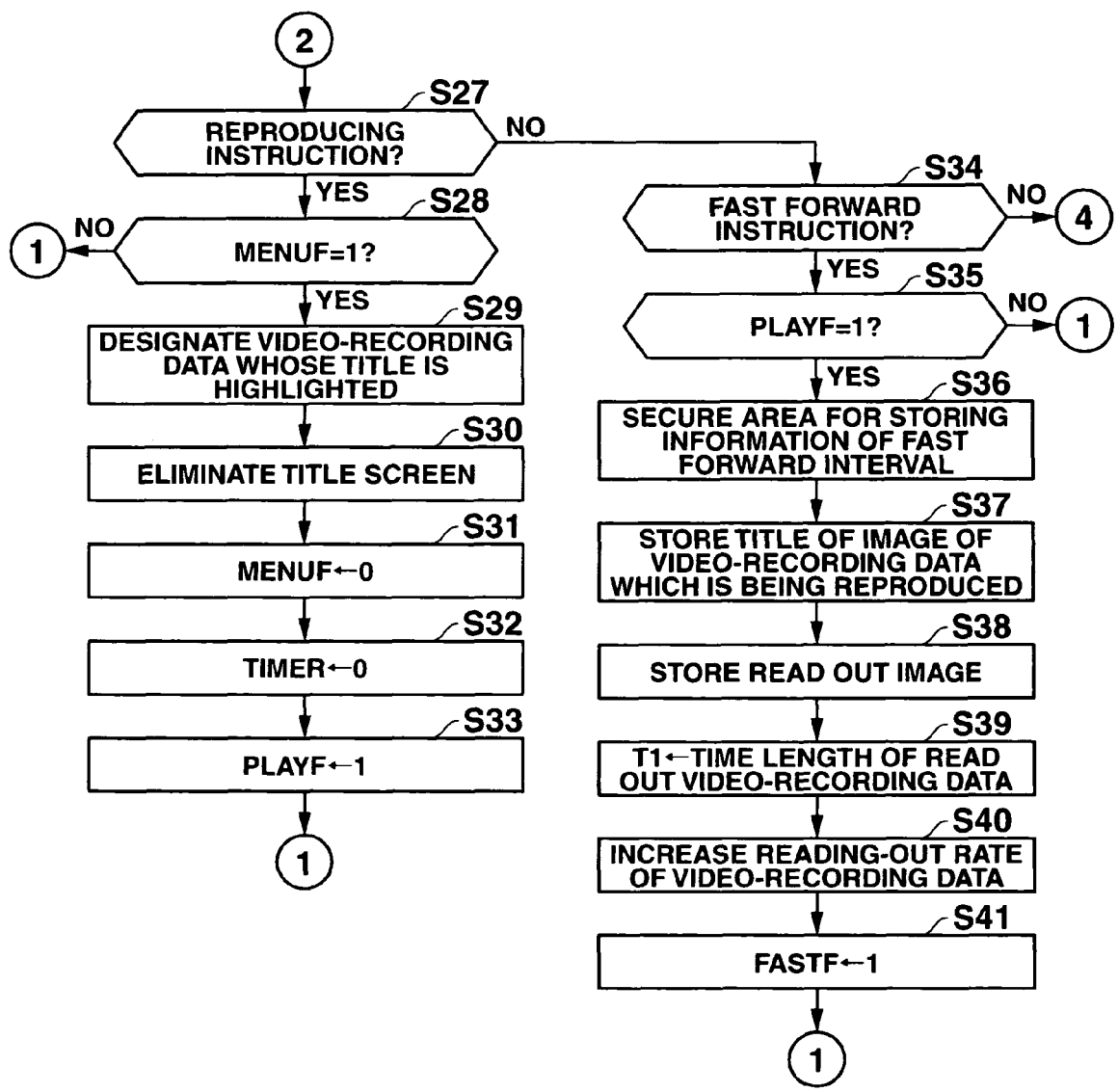
FIG. 4 is a flow chart of the broadcast program reproducing process following to FIG. 3.

In a flow chart shown in FIG. 4, CPU 110 judges at step S27 whether or not the reproducing instruction has been given by operation of the switch unit 108. When the reproducing instruction has been given, CPU 110 judges at step S28 whether MENUF has been set to "1" or not. When MENUF has been set to "1", CPU 110 designates video-recording data whose title is highlighted at step S29. Then, CPU 110 eliminates the title screen at step S30, and resets MENUF to "0" at step S31, and further resets the timer to "0" at step S32, and then sets PLAYF to "1" at step S33. After setting PLAYF to "1", or when MENUF has been set to "0" at step S28, CPU 110 returns to step 2 in FIG. 2, where CPU 110 judges whether or not the switch unit 108 has been operated.

CPU 110 judges at step S34 whether or not a fast forward instruction has been given by operation of the switch unit 108. When the fast forward instruction has been given, CPU 110 judges at step S35 whether PLAYF has been set to "1" or not. When PLAYF has been set to "1", CPU 110 secures an empty area in the recording unit 111 for storing information of a fast forward interval at step S36. CPU 110 stores in such empty area a title of the video-recording data which is being reproduced at step S37 and reads out image data at step S38. Further, CPU 110 stores a time length of the read out video-recording data in a register T1 of RAM in step S39. Then, CPU 110 increases a reading-out rate of video-recording data at step S40, and sets a fast forward flag FASTF to "1" at step S41. After setting FASTF to "1", or when PLAYF has been set to "1" at step S35, CPU 110 returns to step 2 in FIG. 2, where CPU 110 judges whether or not the switch unit 108 has been operated.

Figure 5:
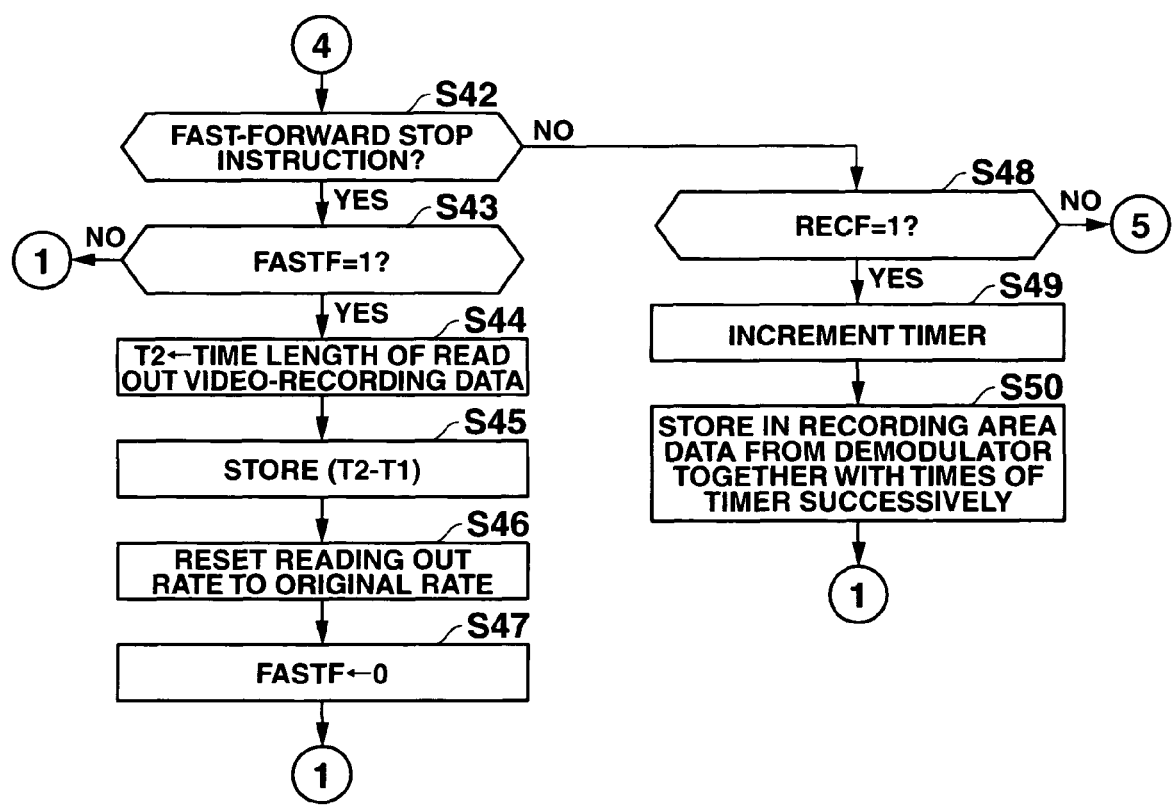
FIG. 5 is a flow chart of the broadcast program reproducing process following to FIG. 4.

In a flow chart shown in FIG. 5, CPU 110 judges at step S42 whether or not a fast-forward stop instruction has been given by operation of the switch unit 108, that is, whether the reproducing instruction has been given by operation of the switch unit 108. When the fast-forward stop instruction has been given, CPU 110 judges at step S43 whether FASTF has been set to "1" or not. When FASTF has been set to "1", CPU 110 stores the time length of the read out image data in a register T2 of RAM at step S44. Further, CPU 110 secures at step S45 an area in the recording unit 111 for storing a time difference T2-T1 between the time lengths stored respectively in the registers T2, T1, that is, a timelength of the fast forward period. Then, CPU 110 resets the reading-out rate to the original reading-out rate at step S46, and further resets FASTF to "0" at step S47. After resetting FASTF to "0", or when FASTF has been set to "0" at step S43, CPU 110 returns to step 2 in FIG. 2, where CPU 110 judges whether or not the switch unit 108 has been operated.

When the switch unit 108 has not been operated, CPU 110 judges what states RECF and PLAYF remain in. CPU 110 judges at step S48 whether RECF has been set to "1" or not. When RECF has been set to "1", CPU 110 increments the timer of RAM at step S49, and stores at step S50 demodulated data (image data and audio data) from demodulating circuit together with a time of the timer successively (video-recording data) in the area in the recording unit 111 prepared for recording a broadcast program.

Figure 6:
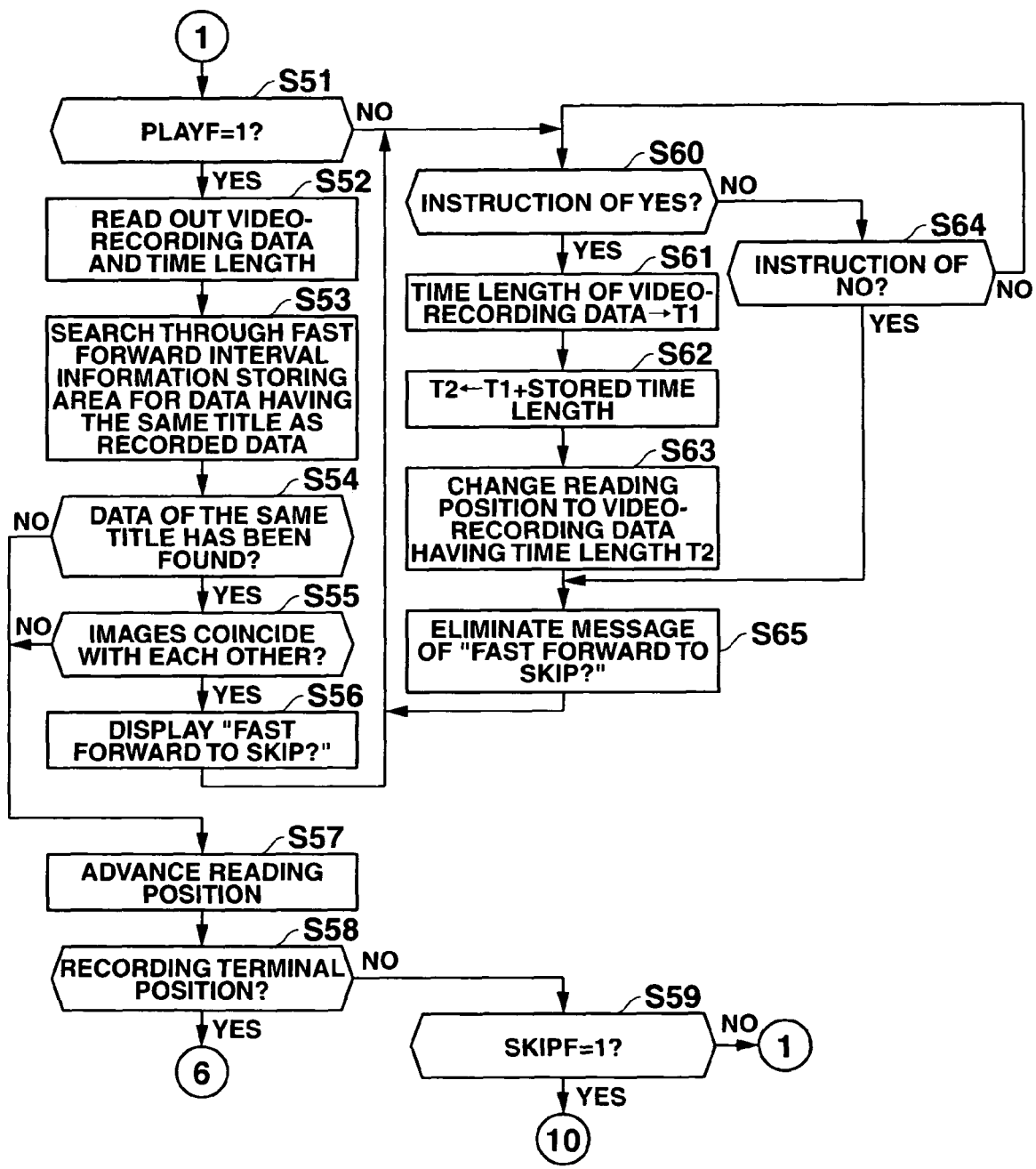
FIG. 6 is a flow chart of the broadcast program reproducing process following to FIG. 5.

When it is determined at step S48 that RECF has been set to "0", CPU 110 judges at step S51 in FIG. 6 whether PLAYF has been set to "1" or not. When PLAYF has been set to "1", CPU 110 reads out the video-recording data and time length from the recording unit 111 at step S52, and searches at step S53 through the area (interval information area) for storing information of fast forward intervals for data having the same title as the video-recording data read out from the recording unit 111. CPU 110 judges at step S54 whether or not data having the same title as the read out video-recording data has been found in the interval information area. When data having the same title as the read out video-recording data has been found in the interval information area, CPU 110 judges at step S55 whether or not image data of the data having the same title coincides with the image data of the read out video-recording data.

When it is determined at step S54 that data having the same title as the video-recording data read out from the recording unit 111 has not been found in the interval information area, or when it is determined at step S55 that the image data of data having the same title does not coincide with the image data of the video-recording data, CPU 110 advances a reading position on the recording medium of the recording unit 111 at step S57, and judges at step S58 in FIG. 6 whether or not the reading position has reached a recording termination position. When the reading position has not yet reached the recording termination position, CPU 110 returns to step S2 in FIG. 2, where CPU 110 judges whether the switch unit 108 has been operated. Meanwhile, when the reading position has reached the recording termination position, CPU 110 returns to step S14 in FIG. 2, where CPU 110 ceases the reproducing operation.

In FIG. 6, when the image data of data having the same title coincides with that of the video-recording data read out from he recording unit 111, such image data is a portion of CM, which was fast forwarded and skipped in the previous reproducing operation. CPU 110 displays on the screen a message saying "Fast forward to skip?" at step S56. Together with this message of "Fast forward to skip?", additional messages for prompting the user to input "YES" or "NO" may be displayed, such as "Fast forward to skip <YES>" and "Fast forward to skip <NO>". Further, when an "enter" key or "Y" key is operated, CPU 110 judges at step S60 whether an instruction of "YES" (acceptance) has been given. When the instruction of "YES" (acceptance) has been given, CPU 110 stores a time length of the video-recording data in the register T1 at step 61. Further, CPU 110 adds the time length stored in the register T1 and an interval length stored in the recording unit 111 (i.e., the time length of the fast forward period calculated at step S45) and stores the sum in the register T2 at step 62. Then, CPU 110 changes the reading position on the recording medium of the recording unit 111 to the video-recording data having the time length stored in the register T2 at step S63. That is, CPU 110 skips an area on which image data of CM is recorded, and advances the reading position to the next broadcast program data. When it is determined at step S60 that the instruction of "YES" (acceptance) has not been given, CPU 110 judges at step S64 whether or not an instruction of "NO" (DENIAL) has been given by operation of "ESC" key or "N" key.

After changing the reading position to the video-recording data of a time length stored in the register T2, or when it is determined at S64 that the instruction of "NO" has been given, CPU 110 eliminates the message of "Fast forward to skip?" at step S65. Then, CPU 110 returns to step S2 in FIG. 2, where CPU 110 judges whether the switch unit 108 has been operated or not. As long as no instruction to cease the reproducing operation is given from the switch unit 108, CPU 110 continues the reproducing operation shown in FIG. 6, and ceases the reproducing operation when the reading position has reached the recording termination position.

In the first embodiment described above, CPU 110 performs its operation as follows: in the case where broadcast program data is read out and reproduced from the recording unit 111 in which broadcast program data including CM data is previously stored, when an instruction to execute a fast forward operation is entered upon start of CM reproduction and an instruction to execute a reproducing operation is entered upon termination of CM reproduction, CPU 110 stores in the recording unit 111 a time length "T2-T1" obtained by subtracting a time T1 at which the instruction to execute a fast forward operation is entered from a time T2 at which the instruction to execute a reproducing operation is entered, an image which is being reproduced at the time T1 when the instruction to execute a fast forward operation is entered, and a title of the image, and when the image which is being reproduced is compared with the stored image, and it is determined that both images and titles coincide with each other, then CPU 110 performs the fast forward operation to skip the reading position of the video-recording data on the recording unit 111.

Therefore, even though the broadcast program including CM portion is recorded in the recording unit 111, the broadcast program can be reproduced with CM portions skipped.

In this case, CPU 110 maybe configured so as to store, upon receipt of an instruction of a fast forward operation, at least one frame of still image out of images of broadcast program data which is being reproduced.

Therefore, an extremely less recording capacity is required for recording such a frame of still image, compared with that required for recording a moving image. As a result, broadcast program data is recorded in the recording unit 111 without any interference caused by skipping CM portions.

Now, the second embodiment of the invention will be described. FIG. 7 is a block diagram illustrating a circuit configuration of a broadcast program recording apparatus according to the second embodiment of the invention. The broadcast program recording apparatus receives through an antenna AT radio waves of BS digital broadcastings and CS digital broadcastings as well as radio waves of terrestrial digital broadcastings. Further, the broadcast program recording apparatus is configured such that a printed circuit substrate can be replaced, whereby the apparatus can receive radio waves of various systems such as, for example, not only radio waves of ISDB-T (Terrestrial Integrated Services Digital Broadcasting) system used in Japan, but also radio waves of ATSC (Advanced Television System Committee) system used in United States of America, and radio waves of DVB-T (Digital Video Broadcasting-Terrestrial) system employed in Europe.

In a program reproducing system of the apparatus, a tuner 201 selects a reception signal of a previously set channel out of radio waves transmitted through an antenna AT. OFDM demodulating circuit 202 demodulates the reception signal selected by the tuner 201. A decoder circuit 203 decodes the reception signal demodulated by the demodulating circuit 202 into broadcast program data including video data and audio data. An input/output unit 204 displays on a display unit 206 video data of the broadcast program data decoded by the decoder circuit 203, and generates sound data of the broadcast program data through a sound generating unit 206

In a controlling system of the apparatus, CPU 110 comprises ROM for storing a control program and initial data, and RAM serving as a work area (both not shown). CPU 110 is connected with the tuner 201, OFDM demodulating circuit 202, decoder circuit 203, and input/output unit 204 through a system bus, and further connected with a switch unit 108, PSI (Program Specific Information) decoder unit 109, and recording unit 111. In response to operation of the switch unit 108, CPU 110 executes a control program stored in ROM, whereby data to be processed is temporarily stored on RAM and the broadcast program recording apparatus is controlled. PSI decoder unit 109 derives a title of the broadcast program and other data from.the demodulated reception signal. The recording unit 111 comprises, for example, a hard disk drive (HDD), and records in accordance with a recording instruction generated by operation of the switch unit 108 the broadcast program data demodulated by the OFDM demodulating circuit 202, that is, encoded broadcast program data on a recording medium such as a hard disk. Meanwhile, in response to a reproducing instruction generated by operation of the switch unit 108, CPU 110 reads out the video data and audio data from the recording unit 111. CPU 110 makes the decoding circuit 203 decode the video data and audio data, whereby the decoded data are output from the input/output unit 204 to the display unit 205 and sound generating unit 206.

The broadcast program recording apparatus shown in FIG. 1, according to the first embodiment of the invention is used to receive a radio wave of the terrestrial digital broadcasting which will come into operation in Japan from 2011 in place of the terrestrial analog broadcasting. Meanwhile, as described above, the broadcast program recording apparatus shown in FIG. 7, according to the second embodiment of the invention is configured so as to receive the terrestrial digital broadcasting, BS digital broadcasting and CS digital broadcasting not only in Japan but also in the United states, Europe, and other countries. Therefore, a computer program to be executed by CPU 110 to perform a broadcast program reproducing process is flexibly designed so as to adapt to specifications of the above broadcasting system. The broadcast program recording apparatus according to the second embodiment of the invention as shown in FIG. 7 operates substantially in the similar manner to those shown in the flow charts of FIGS. 2 to 6, which are executed by CPU 110 in the first embodiment, and therefore further description of the operation of the second embodiment will be omitted.

In the above embodiments, the image which is being reproduced and the image stored in the recording unit are compared, and when both images coincide with each other and also titles of the images coincide with each other, a fast forward operation is executed to skip the reproducing portion. A modification may be made such that, when both images coincide with each other and also titles of the images coincide with each other, and also when both images coincide with each other but titles of the images do not coincide with each other, the fast forward operation is executed to skip the reproducing portion. There are many opportunities at which the same CM is broadcasted in broadcast programs of different channels, and therefore it is useful to skip the reading position on the recording medium even though the titles do not coincide with each other but images of CM coincide with each other.

In the above embodiments, the message saying "fast forward to skip?" is displayed, when the reading position is skipped. A modification may be made such that a portion to be skipped is instantly skipped without displaying such message, that is, without waiting user's instruction. In this modification, the user is only required to give an instruction to start the reproducing operation, and thereafter, the broadcast program is reproduced with CM portions skipped without any additional operation of the user. If the user does not want to skip any portion, the user can return to the original reproducing position which is to be skipped, by giving instructions of ceasing the reproducing operation and of returning operation.

In the above embodiments, the recording unit 111 is provided with the recording area for storing image data to be recorded and recording area for storing information of fast forward intervals, but it may also be preferable to secure a recording area for storing information of fast forward intervals in a separate recording means from the recording unit 111, such as a semi-conductor memory including, for example, a flash memory and the like. In general, the recording unit 111 comprises a hard disk drive, in which a pick-up is held close to a recording surface of a hard disk to write and read image data thereon. Particularly in the reproducing process, the reading position of the hard disk is successively advanced to read out image data. While performing the reproducing operation, CPU 110 moves the pick-up to another recording area to read out information of fast forward intervals, which can increase load of CPU 110 and decrease a seek speed. Therefore, it is preferable to secure the area for storing information of fast forward intervals in the recoding means separate from the recording unit 111

In the above embodiments, an image at the beginning of CM is stored in the area for storing information of fast forward intervals. A modification may be made such that, if plural CMs continue, an image at the beginning of each CM is stored and an period of each CM is skipped. In the terrestrial digital broadcasting, a service for providing CM-coupled information is planned, and attracts interests as an advertising model of data broadcasting coupled to CM. In this case, since every CM is required to be identified, separators of plural continuous CMs can be detected. If an apparatus is arranged so as to skip a period of each CM by utilizing the above service, even though a combination of continuous CMs included in a broadcast program is changed due to a broadcasting time, or even though a combination of continuous CMs included in the broadcast program is different every broadcasting channel, the broadcast program recorded in the apparatus can be reproduced with CMs skipped without failure.

In the above embodiments, the apparatus has been described, which performs the broadcast program reproducing process in accordance with the control program previously stored on ROM in CPU 110. A modification may be made to the apparatus, such that CPU 110 executes a computer program for executing a broadcast program reproducing process stored in an external storing medium such as CD-ROM or the computer program which is downloaded from an external server through a communication unit communicating with a network and installed on the recording unit 111 or a separately prepared nonvolatile memory. In this case, inventions of a program, storage medium and a method of reproducing a broadcast program have been reached.

More specifically, the storage medium on which a computer program for executing a broadcast program reproducing process is recorded, the computer program, when loaded on a broadcast program reproducing apparatus provided with a computer, causing the computer to execute a step A of reading out broadcast program data recorded in a recording unit, and reproducing the read out broadcast program data, and when an instruction to execute a fast forward operation is entered while the broadcast program data is being reproduced in the step A and an instruction to execute a reproducing operation is entered during the fast forward operation, the computer program causes the computer to execute a step B of storing in the recording unit time information based on a time at which the instruction to execute a fast forward operation is entered and a time at which the instruction to execute a reproducing operation is entered, and an image which is being reproduced at the time when the instruction to execute a fast forward operation is entered, a step C of comparing an image of the broadcast program data which is being reproduced in step A and the image stored in the recording unit to judge whether both images coincide with each other, and a step D of executing a fast forward operation to skip a reading position of the broadcast program data stored in the recording unit based on the time information stored in the recording unit, when it is determined in step C that both images coincide with each other.

The computer program causes in step D the computer to display on a displaying unit a message of prompting a user to decide whether the fast forward operation is to be executed or not, and to execute the fast forward operation, when an instruction to execute a fast forward operation is entered, and to continue a reproducing operation, when an instruction not to execute a fast forward operation is entered.

The computer program causes in step B the computer to store in the recording unit at least one frame of still image out of images of the broadcast program data which is being reproduced, when the instruction to execute a fast forward operation is entered.

Further, the computer program causes in step B the computer to store in the recording unit the time information together with identification information for identifying the broadcast program data which is being reproduced in step A, when an instruction to execute a fast forward operation is entered, and to compare an image of the broadcast program data which is being reproduced and the identifying information of the reproduced broadcast program data with the image and the identifying information of the image stored in the recording unit, respectively, thereby judging whether or not both images coincide with each other and both identifying information coincide with each other.

The above embodiments and accompanying drawings only show the principle of the present invention. As long as falling within the technical idea of the invention or the scope of claims, any embodiment or any modification to the invention which a person skilled in the art can make based on the above embodiments and accompanying drawings shall belong to the principle of the present invention.

What is claimed is:

1. A broadcast program recording apparatus comprising:
   a recording unit for recording various sorts of information including broadcast program data;
   a reproduction controlling unit for reading out broadcast program data from the recording unit, and for reproducing the read out broadcast program data;
   a record controlling unit for, when an instruction to execute a fast forward operation is entered while the reproduction controlling unit is reproducing the broadcast program data, and an instruction to execute a reproducing operation is entered during the fast forward operation, storing in the recording unit time information based on a time at which the instruction to execute a fast forward operation is entered and a time at which the instruction to execute a reproducing operation is entered, and an image which is being reproduced at the time when the instruction to execute a fast forward operation is entered;
   an image detecting unit for comparing an image of a broadcast program data which is being reproduced by the reproduction controlling unit and the image stored in the recording unit to judge whether both images coincide with each other; and
   a fast forward controlling unit for instructing the reproduction controlling unit to execute a fast forward operation to skip a reading position of the broadcast program data stored in the recording unit based on the time information stored in the recording unit, when the image detecting unit determines that both images coincide with each other.

2. The broadcast program recording apparatus according to claim 1, further comprising:
   a displaying unit for displaying a message, wherein
   the fast forward controlling unit displays on the displaying unit a message of prompting a user to decide whether the fast forward operation is to be executed or not, and instructs the reproduction controlling unit to execute the fast forward operation, when an instruction to execute a fast forward operation is entered, and instructs the reproduction controlling unit to continue a reproducing operation, when an instruction not to execute a fast forward operation is entered.

3. The broadcast program recording apparatus according to claim 1, wherein
   the record controlling unit stores in the recording unit at least one frame of still image out of images of the broadcast program data which is being reproduced by the reproduction controlling unit, when the instruction to executed a fast forward operation is entered.

4. The broadcast program recording apparatus according to claim 1, wherein
   the record controlling unit stores in the recording unit the time information together with identification information for identifying the broadcast program data which is being reproduced by the reproduction controlling unit, when the instruction to execute a fast forward operation is entered, and
   the image detecting unit compares an image of the broadcast program data which is being reproduced by the reproduction controlling unit and identifying information for identifying the reproduced broadcast program data with the image and the identifying information for identifying the image stored in the recording unit, respectively, thereby judging whether or not both images coincide with each other and both identifying information coincide with each other.

5. A computer program stored on a non-transitory computer-readable medium for executing a broadcast program reproducing process, causing a computer to execute steps of:
   a step A of reading out broadcast program data recorded in a recording unit, and reproducing the read out broadcast program data;
   when an instruction to execute a fast forward operation is entered while the broadcast program data is being reproduced in the step A and an instruction to execute a reproducing operation is entered during the fast forward operation, a step B of storing in the recording unit time information based on a time at which the instruction to execute a fast forward operation is entered and a time at which the instruction to execute a reproducing operation is entered, and an image which is being reproduced at the time when the instruction to execute a fast forward operation is entered;
   a step C of comparing an image of the broadcast program data which is being reproduced in step A and the image stored in the recording unit to judge whether both images coincide with each other; and
   a step D of executing a fast forward operation to skip a reading position of the broadcast program data stored in the recording unit based on the time information stored in the recording unit, when it is determined in step C that both images coincide with each other.

6. The computer program according to claim 5, causing the computer
   to display on a displaying unit a message of prompting a user to decide whether the fast forward operation is to be executed or not, and
   to execute the fast forward operation in step A, when an instruction to execute a fast forward operation is entered, and to continue a reproducing operation in step A, when an instruction not to execute a fast forward operation is entered.

7. The computer program according to claim 5, causing the computer
   to store in the recording unit in step B at least one frame of still image out of images of the broadcast program data which is being reproduced in step A, when the instruction to execute a fast forward operation is entered.

8. The computer program according to claim 5, causing the computer
   to store in the recording unit in step B the time information together with identification information for identifying the broadcast program data which is being reproduced in step A, when an instruction to execute a fast forward operation is entered, and
   to compare an image of the broadcast program data which is being reproduced in step A and the identifying information of the reproduced broadcast program data with the image and the identifying information of the image stored in the recording unit, respectively, thereby judging whether or not both images coincide with each other and both identifying information coincides with each other.

* * * * *